Feb. 6, 1962 G. W. WHELEN III 3,020,509
QUICK DISCONNECT ROTATABLE MOUNTING FOR BEACON LIGHT
Filed Sept. 8, 1959
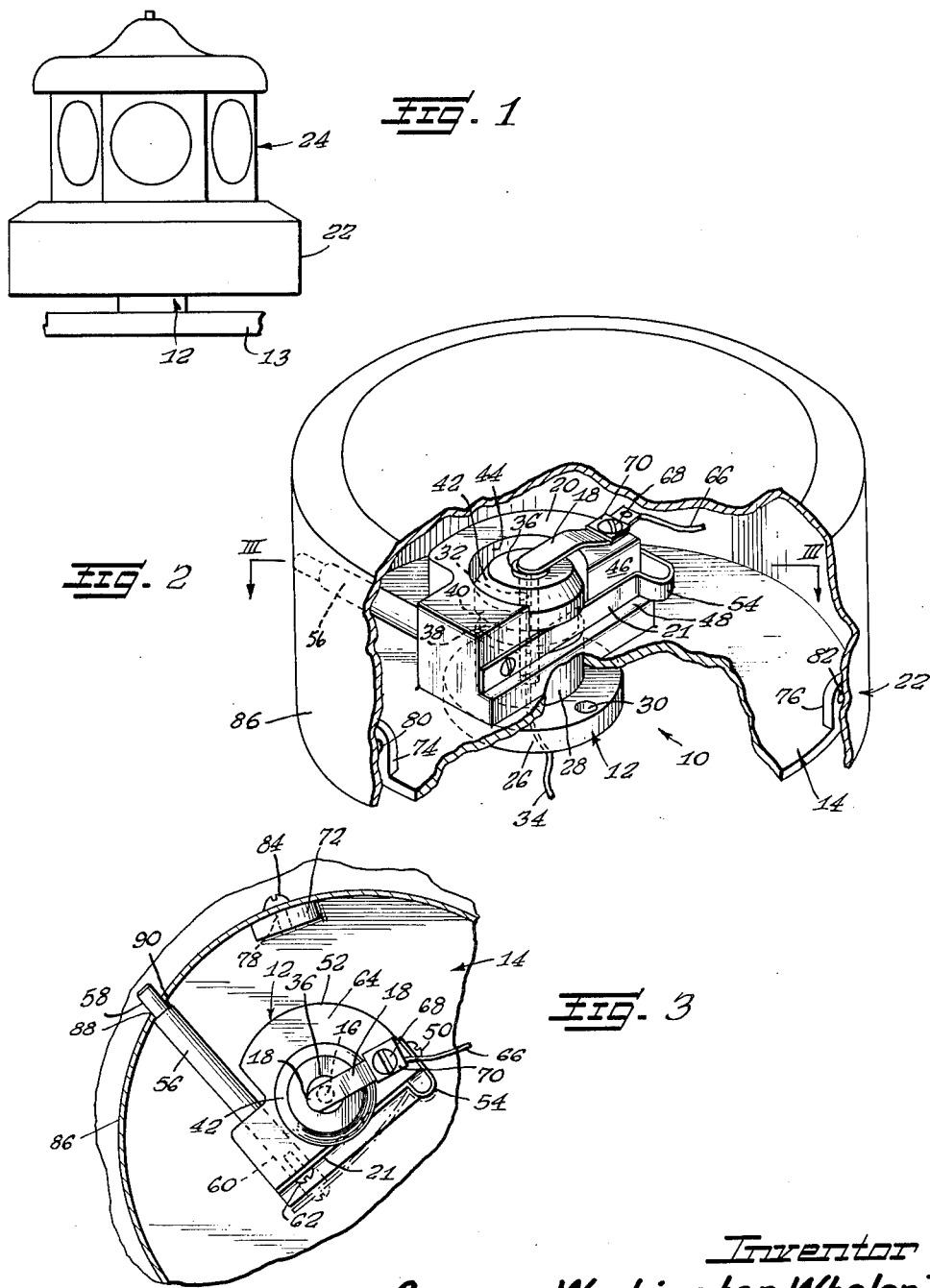
Inventor
George Washington Whelen III

United States Patent Office 3,020,509
Patented Feb. 6, 1962

3,020,509
QUICK DISCONNECT ROTATABLE MOUNTING FOR BEACON LIGHT
George Washington Whelen III, Deep River, Conn., assignor to Whelen Engineering Company, Inc., Deep River, Conn., a corporation of Connecticut
Filed Sept. 8, 1959, Ser. No. 838,716
2 Claims. (Cl. 339—5)

This invention relates to a rotatable mounting device for electrical apparatus, and more particularly to a device adapted for use with a rotatable beacon light or the like and affording an electrical contact locking means which may be quickly and easily disconnected.

Although a variety of devices for mounting an electrical unit in releasable electrical contact on a support unit have been provided previously, these devices have generally required a multiplicity of parts and have also involved a degree of skill and effort in connection or disconnection. The present invention overcomes these disadvantages by providing a rotatable mounting which affords electrical contact for a unit carried thereby and exceptionally easy locking of the mounting in contact position. The invention includes a roof stud bushing which affords a pivot bearing for a beacon base plate, and which has a relatively wide base flange apertured for fastening to a suitable roof support structure and an upstanding cylindrical stud portion which is centrally bored to receive a lead wire therethrough. The wire provides electrical energy for a light which may be mounted on the device and is connected to a terminal contact element secured by insulative means to the top of the stud portion.

The base plate has a journal boss formed thereon defining a vertical bore for releasably receiving the upstanding cylindrical portion of the roof stud, and a resilient positive contact arm is mounted in insulated relation on the boss to engage the contact on the roof stud when the base plate is rotatably supported on the base flange of the roof stud. The contact arm is in turn connected to a means for operating the beacon or the like, a support structure for the beacon being connected to the base plate by fastening means or the like.

Easy locking of the roof stud in rotatable relation to the base plate is accomplished by a resilient arm secured in laterally extending relation on a portion of the boss on the base plate which is cut away to expose the roof stud, and the roof stud defines an annular groove into which the laterally extending arm moves when the base plate is slipped onto the roof stud by the force of gravity. Thus the annular recess affords an upper shoulder or locking means to maintain the journaled relation between the base and stud until it is desired to release the same. For the latter purpose, a manually operable pin or lever arm is slidably received through the boss and connected to the free end of the laterally extending arm to pivot the arm from the roof stud groove against the spring action thereof when desired. Locking engagement of the laterally extending arm in the groove is rendered substantially automatic by an annular, chamfered or beveled construction on the top of the roof stud which cams the locking arm outwardly as the base plate moves into seated position on the roof stud, the locking arm then moving inwardly into locking relation in the annular groove as described, to assure a positive contact to ground the base plate.

Accordingly, it is an object of the present invention to provide a rotatable mounting for electrical apparatus wherein a "quick disconnect" contact structure is afforded which is characterized by easy locking action.

Another object of the invention is to provide a structure as described wherein a quick disconnect action may be effected by slight manual force on a pin element so that an upper element of the device may be removed.

Another object of the invention is to provide a quick disconnect device as described which combines electrical contact and automatic locking.

Yet another object is to provide a device as described which is simple and economical in construction and which requires no special skills or techniques.

Other objects and advantages of the invention will become apparent as the description proceeds in accordance with the drawings in which:

FIGURE 1 is a front elevational view of a beacon such as may be used with the locking device of the invention;

FIGURE 2 is a perspective view, partly broken away of the locking device of the invention; and FIGURE 3 is a fragmentary top plan view taken along the line III—III of FIGURE 2.

Referring now to the drawings, a "quick disconnect" electrical mounting device 10 is shown comprising a roof stud or bushing 12 adapted to be secured to a suitable roof support structure diagrammatically shown and designated by reference numeral 13, a base plate 14 releasably supported in journaled relation on the stud 12, a contact 16 in the stud 12, a positive contact arm 18 supported in resilient engagement with the contact 16 on a boss structure 20 of the base plate 14, a resilient, laterally extending locking arm 21 on the boss structure 20 and a beacon base 22 secured to the base plate 14 for supporting a light 24.

The roof stud or bushing 12 includes an annular base flange 26 and a substantially cylindrical stud portion 28 providing a trunnion for the base plate 14 as hereinafter further described. The base 26 defines a plurality of fastening apertures, as indicated at 30, for receiving screw means or the like so that the roof stud 12 may be quickly and easily installed on the roof support structure 13. The roof stud 12 has formed therein a coaxial bore 32, for receiving a wire 34 leading from a supply of electrical energy such as a battery or the like which is suitably secured by spot welding or the like to the contact 16. The upper end of the bore may be beveled slightly to receive a suitable insulator gasket 36 for insulating the stud portion 28 and the stud 12 from the contact 16.

In accordance with the invention, and in order to afford engagement of the locking arm 21 with the stud 12 such as to hold the base plate 14 in axially fixed, rotatable relationship thereto, the cylindrical stud portion 28 defines an annular groove 38 intermediate its ends and parallel to the bearing flange 26, at a height above the base 26 such as to releasably receive the lock spring arm 21 as hereinafter further described. Thus, a shoulder portion 40 is provided of annular construction which is adapted to afford an abutment for the lock spring arm 21 to prevent mutual axial movement of the stud 12 and the base plate 14 when the base plate is mounted on the stud. It will be appreciated that the stud or bushing is waterproof, and it may be also painted if desired, except within the groove 38, which affords a ground contact means.

In order to afford substantially automatic locking action, the top of the stud portion 28 is annularly beveled or chamfered to define a cam surface 42 (FIGURES 2 and 3) such as to cam the lock spring arm 21 outwardly as the base plate is slipped onto the stud. As indicated, therefore, gravitational force may accomplish this camming action, although the base may also be lowered into position manually.

The boss portion 20 of the base plate 14 defines a bore 44 extending axially and perpendicularly to the base plate and having a diameter such as to receive the stud portion 28 of the stud 12 in snugly journaled relationship therein. The boss 20 also defines a vertical, planar surface 46 of bipartite construction and which intersects the bore 44 in predetermined radially spaced relation to the axial center of the bore and preferably along a chord which is tangential to the inner cylindrical surface of the groove 38. The boss 20 may also define a shelf 48 to fully surround the lower area of the stud portion 28. The laterally extending lock arm 21 has one end thereof fastened by a screw or the like 50 to an arcuate surface 52 of the boss and may be bowed at 54 for added resilience, so that the main portion of the arm extends in normally underlying relation to the shoulder 40 of the groove 38 and in tangential contact with the inner surface of the groove. Thus, when the arm 21 is in the position as shown in FIGURE 2, it locks against the shoulder 40 to prevent relative axial movement of the stud and the base plate as described, and also assures a positive contact to ground the base plate.

In order to release the lock spring arm 21, a pin member 56 is provided which extends outwardly at a reduced portion 58 thereof slightly beyond the periphery of the base plate 14 and is slidably received in a bore 60 of the boss 20. Thus the pin or arm is secured to the free end of the lock spring arm 21 by means of a suitable screw or the like 62 so that inward movement of the pin urges the lock spring arm away from the stud 12 against the resilient locking bias of the arm and radially outwardly of the shoulder 40 to permit removal of the base plate 14 from the stud 12.

However, the biasing action of the lock spring arm is such that when the base plate 14 is moved onto the stud 12, the weight of the base plate and the light 24 will easily cam it outwardly by means of the cam surface thereof and thereupon the arm will spring into locking relationship with the stud beneath the shoulder 40.

The contact arm 18 is secured to the top surface 64 of the boss 20 (FIGURE 3) and in electrical connection with a lead line 66 by suitable screw means 68 or the like. The line 66 leads from the contact arm 18 to the light structure 24 and to a motor (not shown) for effecting rotation of the beacon base. Suitable insulating members 70 may be provided to insulate the arm 18 from the boss 20 on the grounded base plate.

In order to secure the beacon base structure 22 to the base plate 14, the base plate 14 preferably defines a plurality of integrally formed upstanding ears 72, 74 and 76 which have threaded apertures formed therein, as indicated by reference numerals 78, 80 and 82, receiving suitable screw elements or the like 84. The beacon base 22 may be of conventional construction and supports the light 24, in accordance with the understanding of those skilled in the art. As seen in FIGURE 3, the wall 86 of the beacon base 22 defines an aperture 88 for the pin member 56, and may also coact with the shoulder 90 between the reduced pin portion 58 and the larger diameter portion thereof to provide a stop.

There has thus been provided a quick disconnect mounting for a rotating beacon light or the like which is extremely simple and efficient in construction and which may be connected automatically by virtue of a spring acting lock arm which is cammed into locking engagement with the support stud for the device as the base plate for the mounting is moved by gravity or manually, over the stud into connected position. The lock spring arm provides no interference with the rotatable movement of the base plate and of the light but serves to maintain the same securely in position while affording a positive ground contact at all times. The release of the lock arm is effected in an extremely simple manner by means of an axially slidable pin mounted to the spring arm and extending through a wall of the beacon base for manual operation. Accordingly, the device may be used over extended periods of time without the need for replacement of parts, and may be advantageously employed in a wide variety of applications.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A quick disconnect mounting for a beacon light or the like comprising a bearing stud having an upstanding cylindrical stud portion and a bottom base flange extending radially from said stud portion, a base for mounting a beacon light or the like comprising a bottom plate having a journal opening receiving said cylindrical stud portion and rotatably mounted in bearing relation on said base flange, said base having a beacon base portion overlying said base plate for supporting the beacon light or the like, an upstanding boss on said base plate having a bore continuous with said opening and receiving said stud portion therein, an annular recess formed in said stud portion, said stud portion defining locking shoulder means within said recess, a resilient arm mounted on said boss and extending in perpendicular relation to the axis of said stud portion and biased into said recess in said stud portion in releasably locking relationship with the shoulder means therein, a rod reciprocably extending through said boss and fixedly secured to a free end of said resilient arm, said rod extending outwardly of said beacon base portion to afford manual reciprocation thereof for selectively moving said arm outwardly of said recess to disconnect said base from said stud, contact means at the upper end of said cylindrical portion and insulated therefrom, electrical lead means extending into said stud and connected to said contact means, contact means on said boss releasably engaging said contact means on said stud portion, and lead means connected to said contact means on said boss for energizing a beacon light or the like on said base.

2. A quick disconnect mounting for a beacon light or the like comprising a bearing stud having an upstanding cylindrical stud portion and a bottom base flange extending radially from said stud portion, a base for mounting a beacon light or the like comprising a bottom plate having a journal opening receiving said cylindrical stud portion and rotatably mounted in bearing relation on said base flange, said base having a beacon base portion overlying said base plate for supporting the beacon light or the like, an upstanding boss on said base plate having a bore continuous with said opening and receiving said stud portion therein, an annular recess formed in said stud portion, said stud portion defining locking shoulder means within said recess, a resilient arm mounted on said boss and extending in perpendicular relation to the axis of said stud portion and biased into said recess in said stud portion in releasably locking relationship with the shoulder means therein, a rod reciprocably extending through said boss and fixedly secured to a free end of said resilient arm, said rod extending outwardly of said beacon base portion to afford manual reciprocation thereof for selectively moving said arm outwardly of said recess to disconnect said base from said stud, contact means at the upper end of said cylindrical portion and insulated therefrom, electrical lead means extending into said stud and connected to said contact means, contact means on said boss releasably engaging said contact means on said stud portion, and lead means connected to said contact means on said boss for energizing a beacon light or the like on said base, said cylindrical stud portion having a beveled upper end for camming said arm outwardly during mounting of said base on said stud.

References Cited in the file of this patent

UNITED STATES PATENTS

| | | |
|---|---|---|
| 1,648,518 | Werner | Nov. 8, 1927 |
| 2,052,816 | Dunn | Sept. 1, 1936 |
| 2,175,124 | Kulhanek | Oct. 3, 1939 |
| 2,221,272 | Snelling | Nov. 12, 1940 |
| 2,574,456 | Anderson | Nov. 13, 1951 |
| 2,691,143 | Lawson | Oct. 5, 1954 |
| 2,766,473 | Thackara | Oct. 16, 1956 |

FOREIGN PATENTS

| | | |
|---|---|---|
| 936,649 | France | Feb. 23, 1948 |